United States Patent [19]

Ishii et al.

[11] Patent Number: 5,265,083
[45] Date of Patent: Nov. 23, 1993

[54] PORTABLE DISC PLAYER

[75] Inventors: Toshiyuki Ishii, Kanagawa; Takao Ihashi, Chiba; Yoshisuke Kuroda; Hitoshi Nozaki, both of Kanagawa, all of Japan

[73] Assignee: Sony Corporation, Tokyo, Japan

[21] Appl. No.: 762,904

[22] Filed: Sep. 19, 1991

[30] Foreign Application Priority Data

| Sep. 26, 1990 [JP] | Japan | 2-256587 |
|---|---|---|
| Oct. 1, 1990 [JP] | Japan | 2-263474 |
| Apr. 5, 1991 [JP] | Japan | 3-100387 |

[51] Int. Cl.[5] .............................. G11B 7/00
[52] U.S. Cl. ........................ 369/75.2; 369/99; 369/75.1; 369/77.1
[58] Field of Search ........... 369/75.1, 75.2, 72.1, 369/77.2, 76, 99

[56] References Cited

U.S. PATENT DOCUMENTS

| 4,439,850 | 3/1984 | Takahara et al. | 369/77.2 |
|---|---|---|---|
| 4,811,314 | 3/1989 | Alves | 369/75.1 |
| 4,823,337 | 4/1989 | Van Zanten et al. | 369/270 |
| 5,181,197 | 1/1993 | Sugie et al. | 369/75.1 |

FOREIGN PATENT DOCUMENTS

| 0149101 | 12/1984 | European Pat. Off. |  |
|---|---|---|---|
| 0252646 | 1/1988 | European Pat. Off. |  |
| 0412462A2 | 8/1990 | European Pat. Off. |  |
| 59-107449 | 6/1984 | Japan . |  |
| 59-112401 | 6/1984 | Japan . |  |
| 63-140449 | 6/1988 | Japan . |  |
| 4254964 | 9/1992 | Japan | 369/99 |

OTHER PUBLICATIONS

Brochure on Data Discman Electronic Book Player by Sony, published by Sony Electronic Publishing Project, Shibaura Technology Center, Sony Corporation, Tokyo, Japan, 1990.

Primary Examiner—Paul M. Dzierzynski
Assistant Examiner—Drew A. Dunn
Attorney, Agent, or Firm—Philip M. Shaw, Jr.

[57] ABSTRACT

A portable disc player has a casing. In the casing, there are enclosed: disc rotation driving means for rotating an optical disc; an optical head which is arranged so as to be movable in the radial direction of the optical disc; a signal processing section for executing a predetermined signal process to a signal which has been read out by the optical head; and control means for controlling the operations of the rotation driving means, the optical head, and the signal processing section on the basis of an input from an X-Y device and trigger buttons. A display unit comprising an outer cover on which an LCD display is arranged is rotatably attached to the casing.

11 Claims, 12 Drawing Sheets

Fig. 9A

| SYNC 12 BYTES | HEADER 4 BYTES | SUB-HEADER 8 BYTES | USER'S DATA 2048 BYTES | ERROR DETECTION 4 BYTES | P PARITY 172 BYTES | Q PARITY 104 BYTES |
|---|---|---|---|---|---|---|

2352 BYTES — FORM 1

Fig. 9B

| SYNC 12 BYTES | HEADER 4 BYTES | SUB-HEADER 8 BYTES | USER'S DATA 2324 BYTES | RESERVE 4 BYTES |
|---|---|---|---|---|

2352 BYTES — FORM 2

Fig. 10

| FILE NO. 2 BYTES | CHANNEL NO. 2 BYTES | SUB-MODE 2 BYTES | DATA TYPE 2 BYTES |
|---|---|---|---|

SUB-HEADER

PORTABLE DISC PLAYER

BACKGROUND OF THE INVENTION

1. Field of the Invention

The invention relates to a portable disc player which can reproduce a CD-I disc on which image information and the like in addition to audio information are recorded.

2. Description of the Prior Art

There has been proposed a CD-I (CD Interactive) system in which image data (natural image, animation, computer graphics, etc.), text data, program data, and the like in addition to audio data are recorded onto a CD (Compact Disc) and which can execute the operation in an interactive manner. Since such a CD-I system has a reproducing function of characters, images audio data, computer data, etc., it can be used in AV industrial apparatuses mainly for the purpose of audio and video fields, an electronic publishing which mainly handles characters, data base services mainly comprising information files, education and amusement which are mainly executed by interactive responses, and the like. Thus, the CD-I system is expected as a media of a new format.

In the CD-I system, various specifications are predetermined so that it can widely be spread as a home-use system while keeping a compatibility. That is, in the CD-I system, a CPU of the 68000 type (microprocessor of 16 bits developed by Motorola Inc.) is used and an operating system which is fundamentally based on widespread OS9 is used as a real-time Operating system which handles various kinds of files. An X-Y device and two trigger buttons are used as an input device. Two audio and video systems are prepared as an output system. The CD-I player is constructed so that it can reproduce ordinary compact disc for a music.

The player to reproduce such a CD-I disc needs: a CD-ROM driver comprising an optical head, an optical head driver, a CD reproducing circuit, a CD-ROM reproducing circuit, and the like; and a computer using a CPU of the 68000 type for reproducing characters, images, and computer data. Further, hitherto, in the case of constructing the CD-I system, it is necessary to connect a display and an audio amplifier to the CD-I player.

That is, FIG. 1 shows an example of a conventional CD-I system. In FIG. 1, a CD-I player 101 has therein a computer comprising a CD-ROM driver and a CPU of the 68000 type. A joy card 104 is connected as an input device to the CD-I player 101. Two trigger buttons 102a and 102b and an X-Y device 103 are arranged on the joy card 104. A CRT display 105 and an audio amplifier 106 are connected to the CD-I player 101. Two speakers 107a are connected to the audio amplifier 106.

There is a demand such that the CD-I player is carried to the outside and the CD-I system is easily used in a vehicle or at a destination. As shown in FIG. 1, however, the conventional CD-I player is large in size and it is necessary to connect the CRT display 105 and the audio amplifier 106. The conventional CD-I player, therefore, has a problem such that it is impossible to easily carry the CD-I system to the outside and use it.

OBJECT AND SUMMARY OF THE INVENTION

It is, therefore, an object of the invention to provide a portable disc player which can be easily carried to the outside.

According to an aspect of the invention, there is provided a portable disc player for reproducing an optical disc on which image data in addition to audio data have been recorded, comprising a casing enclosing (a) disc rotation driving means for rotating a loaded optical disc, (b) an optical pickup which is provided so as to be movable in a radial direction of the optical disc which is rotated by the disc rotation driving means, (c) a signal processing section to execute a predetermined signal process to a signal which has been read out by the optical pickup, (d) control means for controlling operations of the disc rotation driving means, the optical pickup, and the signal processing section on the basis of input signals from an operating section, (e) a disc loading section located at a position lower than the surface of the casing and which enables the rotation of the optical disc by the disc rotation driving means, and wherein a disc receiving section of the disc rotation driving mean is arranged so as to be projected to the disc loading section, and (f) a rotary member which has a disc sandwiching section for sandwiching the optical disc together with the disc rotation driving means in a state in which the disc sandwiching section is closed for the casing and for rotating the optical disc together with the disc rotation driving means and wherein a display means is rotatably hinged to the casing.

The above, and other, objects, features and advantage of the Present invention will become readily apparent from the following detailed description thereof which is to be read in connection with the accompanying drawings.

BRIEF DESCRIPTION OF THE DRAWINGS

FIGS. 9A and B are schematic diagrams which are used in the explanation of the specifications of a CD-I;

FIG. 10 is a schematic diagram which is used in the explanation of the specifications of the CD-I;

DETAILED DESCRIPTION OF THE PREFERRED EMBODIMENTS

Figure 1:
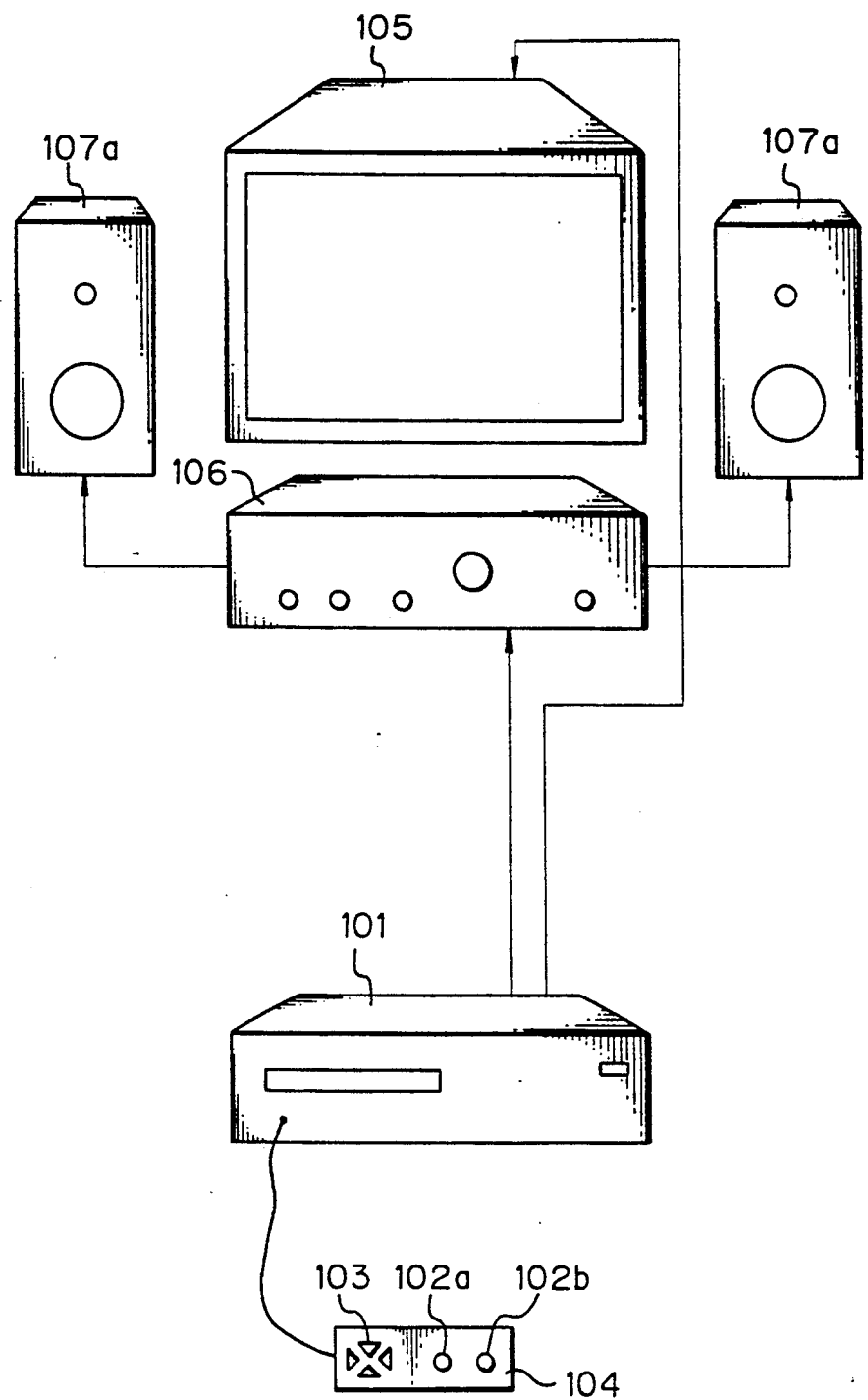
FIG. 1 is a perspective view which is used in the explanation of a conventional CD-I system.
Figure 2:
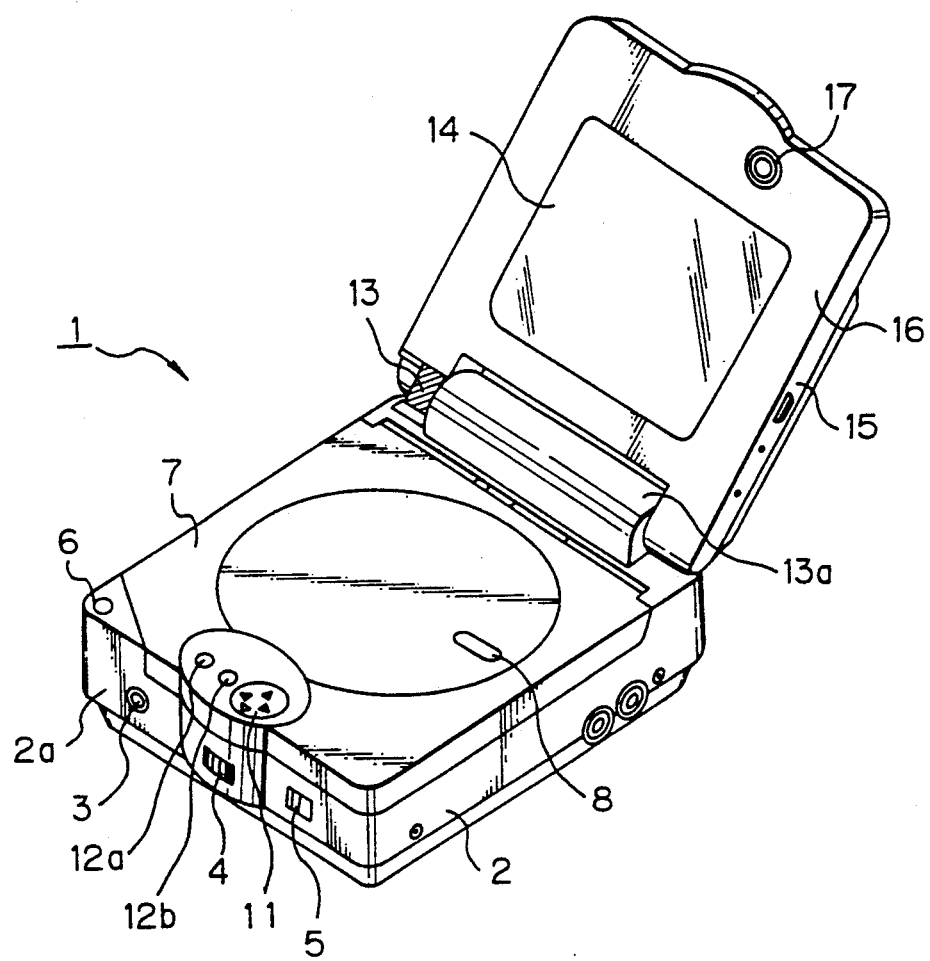
FIG. 2 is a perspective view showing a whole construction of an embodiment of the invention.
Figure 3:
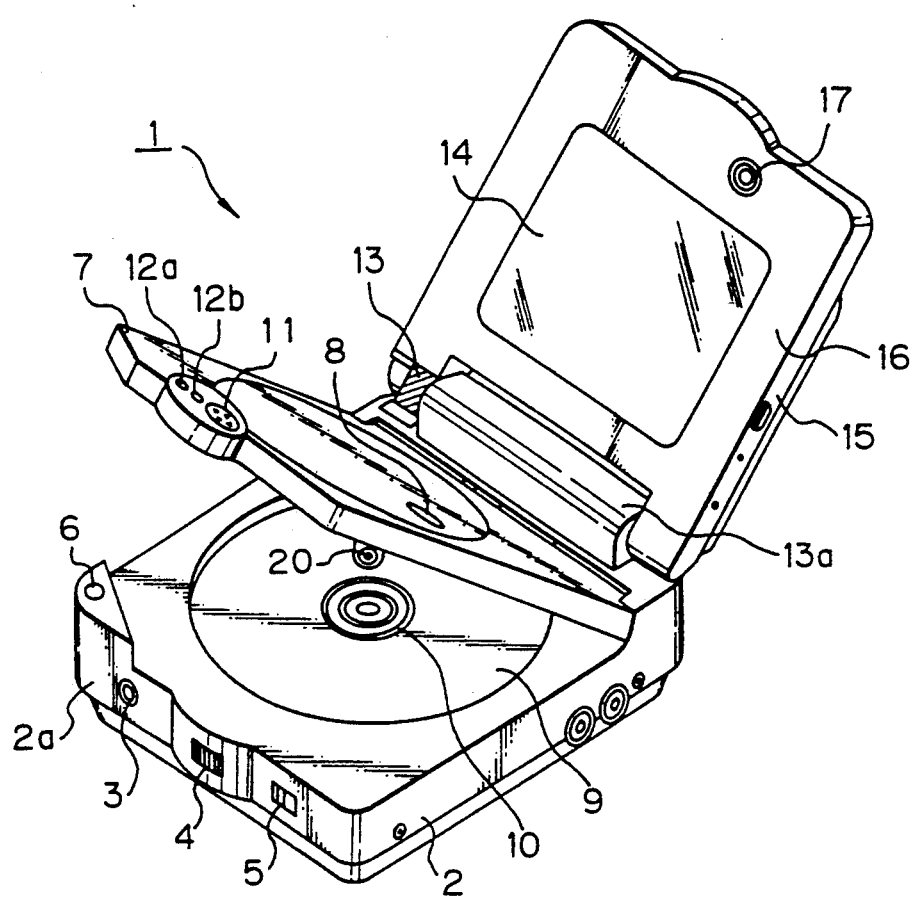
FIG. 3 is a perspective view showing a whole construction of an embodiment of the invention.

An embodiment of the invention will be described in accordance with the following order.
- a. Construction of an embodiment
- b. CD-I format
  - b1. Data structure
  - b2. Writing of audio data
  - b3. Writing of video data
  - b4. Disc
  - b5. Hardware
- c. Internal construction of an embodiment
- d. Operation of an embodiment
- e. Operation when display is unnecessary
- a. Construction of an embodiment FIGS. 2 to 8 are diagrams showing a whole construction of a CD-I player to which the invention has been applied. In FIGS. 2 to 8, reference numeral 1 denotes a whole CD-I player to which the invention has been applied. In order to enable the CD-I disc having a diameter of 12 cm to be easily carried to the outside an LCD display 14 is integrated into the CD-I player 1 and the size and weight of the CD-I player 1 are reduced by realizing an IC, using chip parts, and the like. Dimensions of the entire CD-I player 1 are set to, for instance, a width of 140 mm, a length of 170 mm, and a height of 60 mm.

A disc driving section to rotate a disc (not shown which has been loaded, a head driving section to move the optical head in the radial direction of the disc, and a printed circuit board to process a reproduction signal from the optical head are enclosed in the casing of the player main body portion 2 of the CD-I player 1. Further, a computer comprising a CPU of the 68000 type is enclosed in the casing.

A head phones jack 3, a sound volume adjusting dial 4, and a power on/off switch 5 are arranged on a front side surface 2a of the player main body portion 2. An open button 6 is arranged on a front side upper edge of the player main body portion 2.

Figure 4:
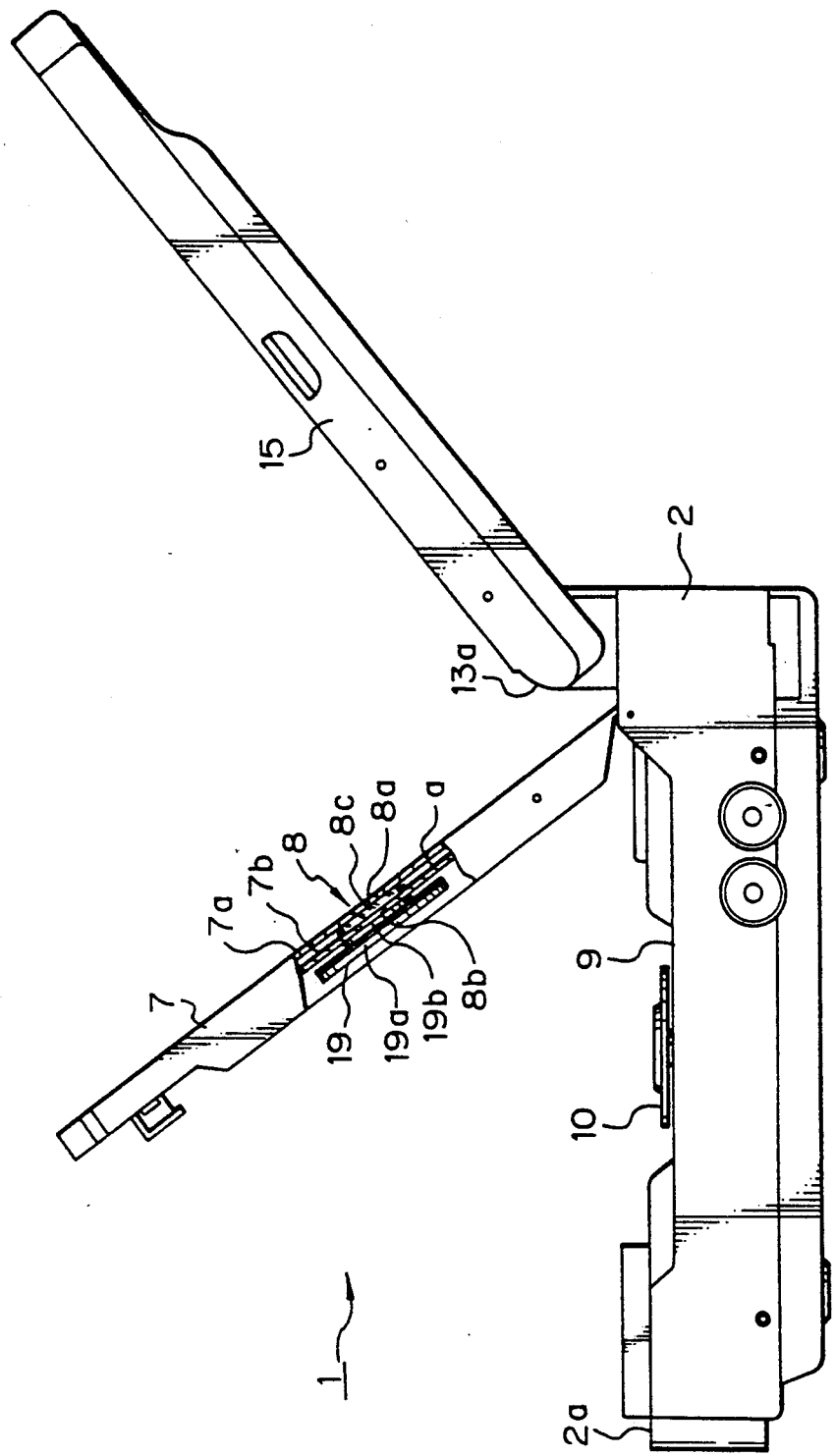
FIG. 4 is a side elevational view showing a whole construction of an embodiment of the invention.
Figure 5:
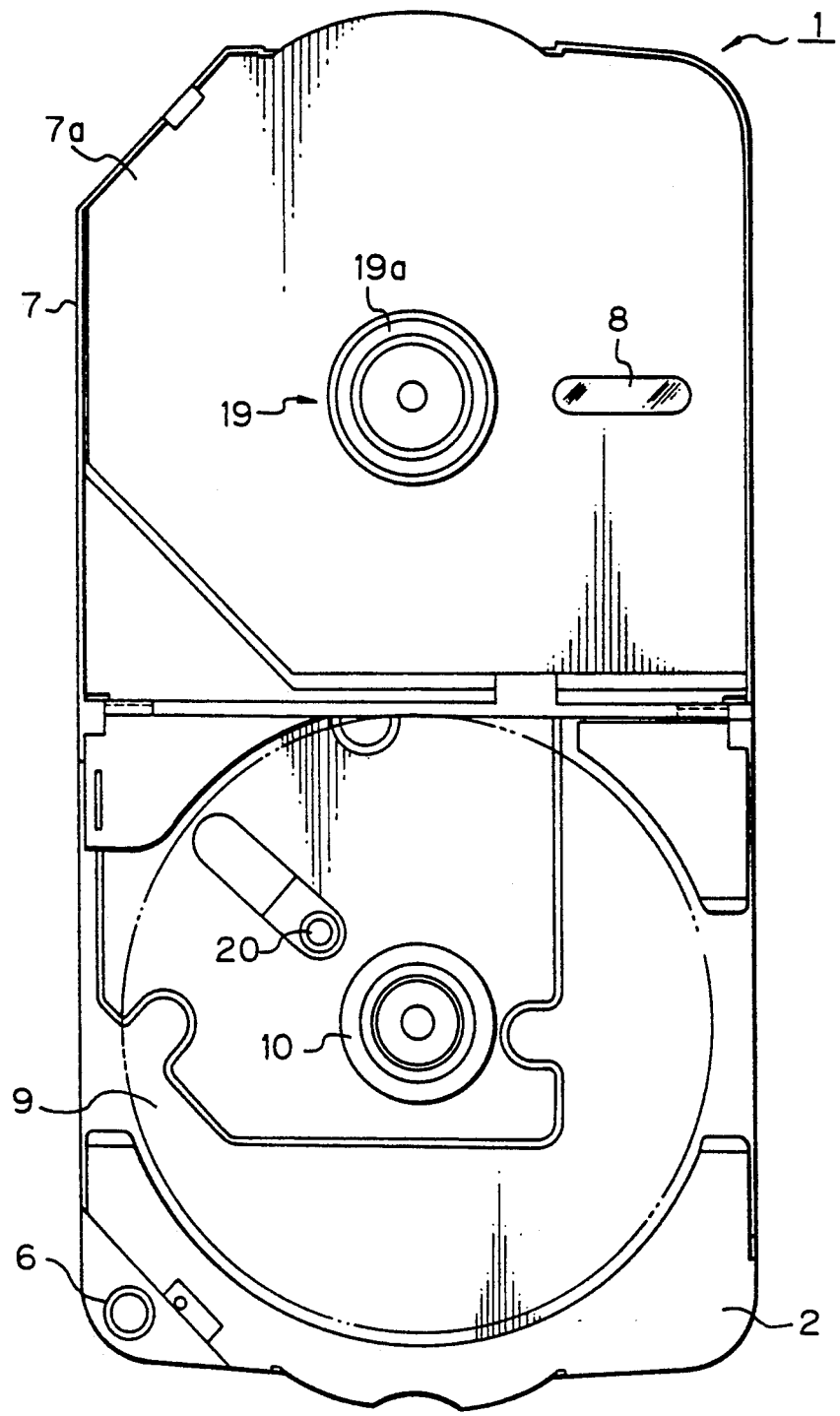
FIG. 5 is a plan view of a state in which a middle cover of an embodiment of the invention has been opened.
Figure 6:
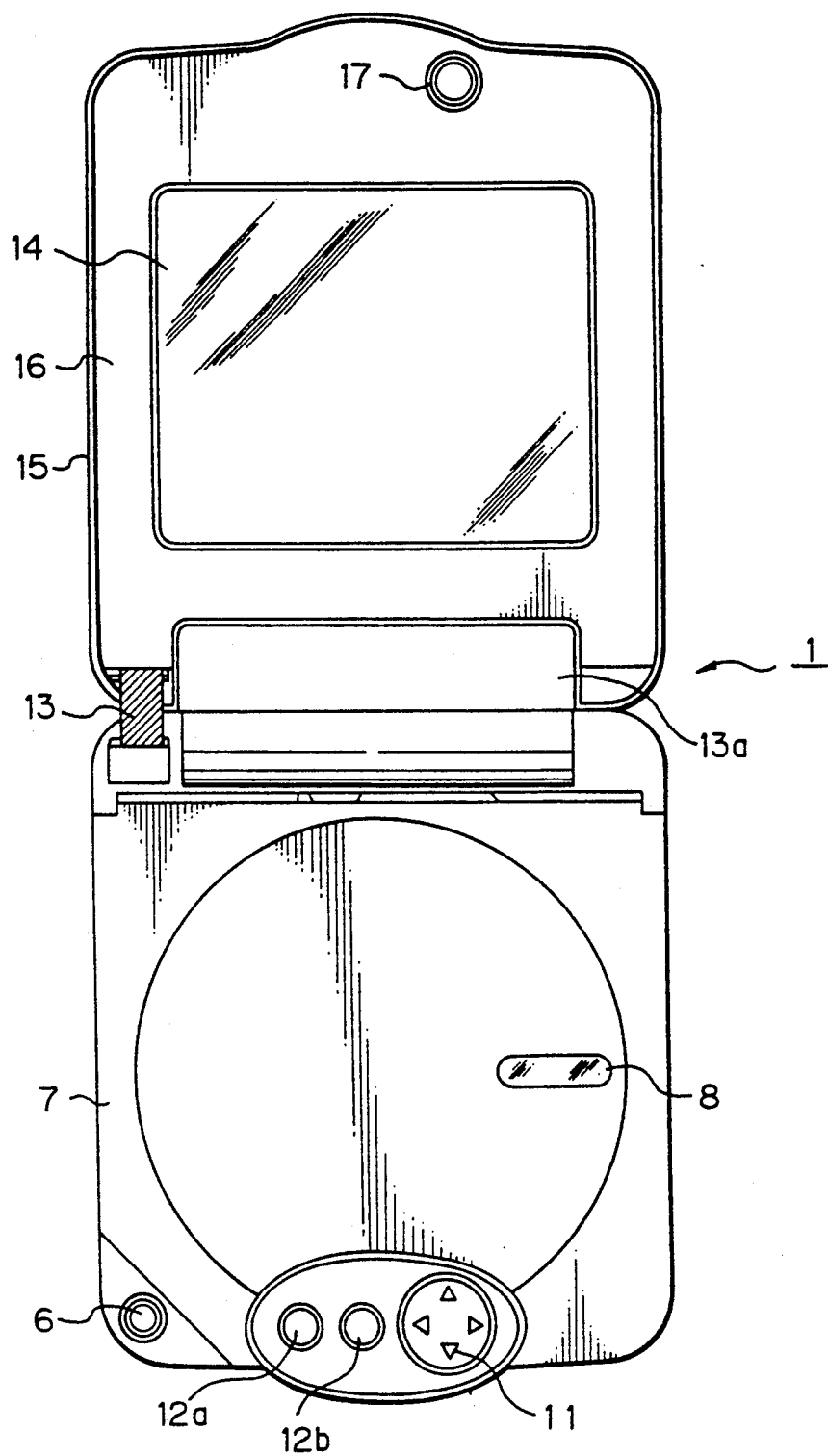
FIG. 6 is a plan view of a state in which an outer cover of the embodiment of the invention has been opened.
Figure 7:
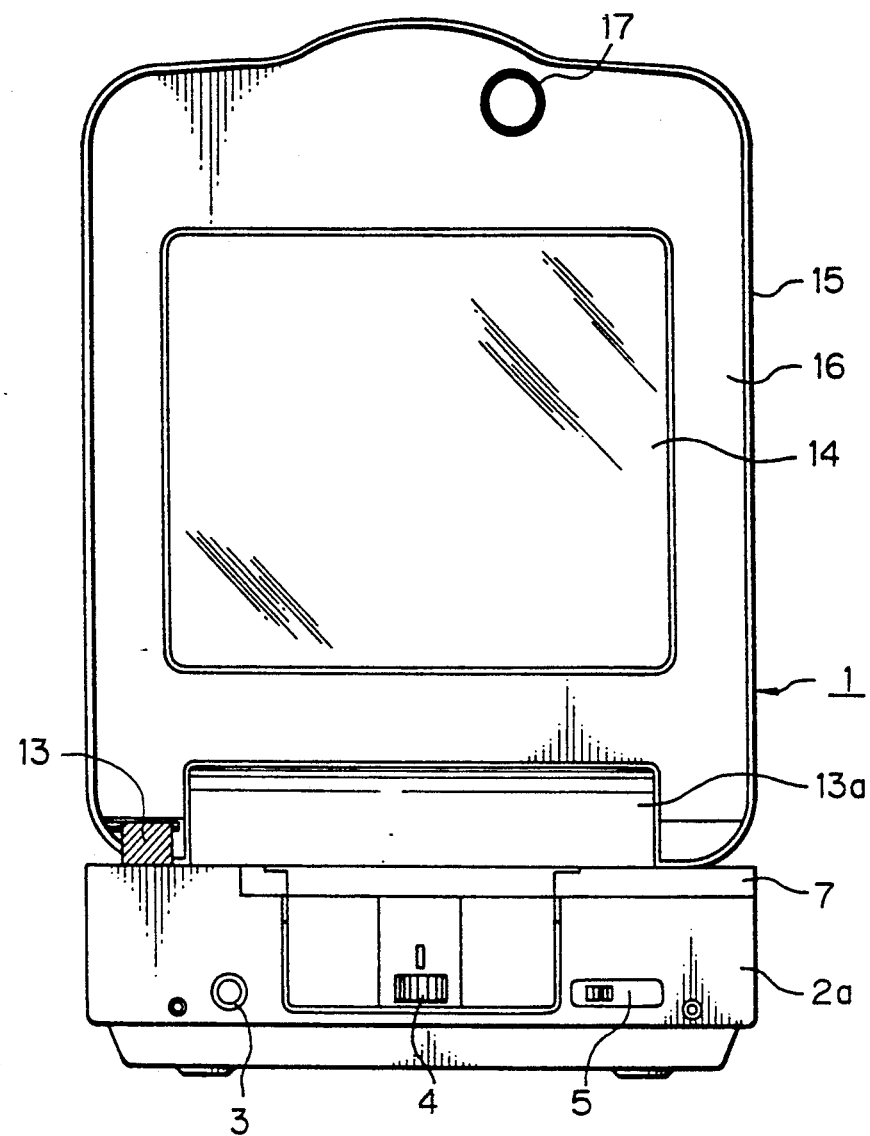
FIG. 7 is a front view of a state in which the outer cover of the embodiment of the invention has been opened.
Figure 8:
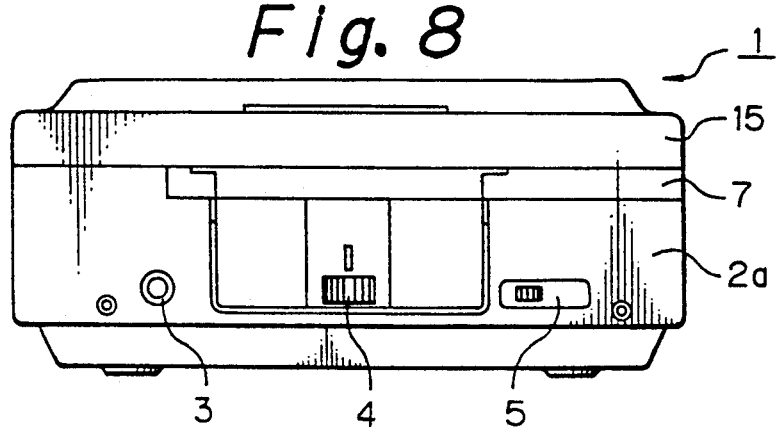
FIG. 8 is a front view of a state in which the outer cover of the embodiment of the invention has been closed.

Referring to FIG. 4, a middle cover 7 is rotatably hinged to a rear edge portion of the player main body portion 2 of the CD-I player 1. The middle cover 7 covers the upper surface side of the player main body portion 2. An inner surface plate 7b is arranged on the inner surface side of an upper surface plate 7a of the middle cover 7 so as to have a gap a of a predetermined width. A chucking member 19 is arranged in a central portion of the inner surface plate 7b in correspondence to a turntable 10. The chucking member 19 is formed by a chucking plate 19a having a diameter equal to or larger than the diameter of the turntable 10 and a shaft portion 19b to support the chucking plate 19a. The shaft portion 19b is penetrated and supported to the inner surface plate 7b so that it can freely slide and swing within a range of the width of gap a. In a closed state of the middle cover 7, the chucking plate 19a is stably adhered onto the upper surface of the central portion of the disc (not shown) which is mounted on the turntable 10. Therefore, the disc is certainly sandwiched by the chucking member 19 and the turntable 10.

By depressing the open button 6, the lock of the middle cover 7 is released by a lock mechanism (not shown), so that the middle cover 7 is slightly lifted up from the player main body portion 2 and the middle cover 7 is opened. When the middle cover 7 is opened, the disc can be loaded/unloaded. A window portion 8 is formed in the middle cover 7. A transparent member is used as a window portion 8. The window portion 8 is away from an attaching portion of the chucking member 19 and is mounted in a portion of the middle cover 7 which does not correspond to an optical pickup 20 provided for a disc loading portion 9 of the player main body portion 2. The disc loading portion 9 is formed such that it is recessed below the surface of the player main body portion 2 by a step portion. The disc loading portion 9 has a concave shape as a whole so as to allow the rotation of disc in such a state that the optical disc is mounted on the turntable 10 and the middle cover 7 is closed. The window portion 8 is constructed in a manner such that holes 8a and 8b are formed, respectively, in the upper surface plate 7a and the inner surface plate 7b of the middle cover 7 are enlongated in a radial direction using the chucking member 19 as a center so as to face each other and to have a predetermined width. A transparent member 8c is fitted into the gap a located between the holes 8a and 8b. Although the transparent member 8c is formed into a flat plate shape as shown in the diagrams, it can be also formed such that a cross section in the width direction has a semicylindrical shape or a lens shape whose both surfaces are formed into convex shapes. The turntable 10 is formed such that at least its portion for receiving the disc projects from the base plane of the disc loading portion 9. Further, the turntable 10 is exposed through an opening formed in the base plane of the disc loading portion 9 so that the optical pickup 20 can move to a position which doesn't correspond to the window portion 8 in the radial direction of the disc. The optical pickup 20 and turntable 10 are made as a unit together with the feeding mechanism of the optical pickup 20 and the driving motor of the turntable 10 and this unit is attached to the player main body portion 2 through the damping mechanism such as a damper (not shown).

The disc loading portion 9 can be seen through the window 8 from the outer surface side of the middle cover 7 even in a state in which the middle cover 7 has closed down over the disc loading portion 9 of the player main body portion 2, so that the existence of the disc and a rotating state can be directly easily visually checked. The disc, therefore, can be certainly reproduced without executing an erroneous operation. On the other hand, since the window portion 8 is formed at a position which does not correspond to the optical pickup 20 of the disc loading portion 9, there is no danger that a laser beam from the optical pickup 20 will leak to the outside.

An X-Y device 11 and trigger buttons 12a and 12b are arranged on a front edge surface of the middle cover 7. The X-Y device 11 can designate positions in the X and Y directions by depressing portions which are deviated from the center in the vertical and horizontal direction, respectively. The above electrical circuit parts to which the trigger buttons 12a and 12b and the X-Y device 11 are connected are arranged in the gap a between the upper surface plate 7a and the inner surface plate 7b. A pointing device such as track ball, mouse, joy-stick, or the like can be used as such an X-Y device 11.

An outer cover 15 is rotatably arranged over the middle cover 7 by providing a hinge portion on the rear edge side of the player main body portion 2 and the upper side of the hinge portion of the middle cover 7. A rotation supporting device is provided in an axially supporting portion 13a for the player main body portion 2. As a rotation supporting device, a rotation supporting device for an electrical apparatus (refer to Japanese Patent Laid Open Publication No. Hei 2-54296) which has already been filed by the same applicant as the present invention can be used. Consequently, the user can easily set an optimum opening/closing angle by merely directly falling down/lifting up and rotating the outer cover 15 itself. As well as the case of seeing the LCD display 14, when the middle cover 7 is opened and the disc is loaded onto or unloaded from the disc loading portion 9 of the player main body portion 2, the outer cover 15 is stopped and held in a state in which the outer cover has been opened and rotated at a position such as not to obstruct the opening/closing operation of the middle cover 7 without pressing the outer cover 15, so that the disc can be easily loaded or unloaded. The outer cover 15 can be also manually opened or closed. The outer cover 15 can be opened to an opening/closing angle of 90° or more. An attaching enclosing portion (not shown) of a battery is also formed on the rear surface side of the player main body portion 2 in a manner similar to other electronic apparatuses. The battery of a predetermined capacity is set as a power source.

The LCD display 14 of a size of, e.g., 4 inches is arranged on a back surface 16 of the outer cover 15. By opening the outer cover 15, the LCD display 14 is exposed, thereby enabling a picture plane of the LCD display 14 to be seen. An LCD driving switch 17 is also arranged on the back surface 16. By operating the LCD driving switch 17, the LCD display 14 can be on/off controlled. The LCD display 14 and an electrical circuit of the player main body portion 2 are connected by a flexible printed circuit board 13.

b. CD-I format

The CD-I player to which the invention has been applied can reproduce a CD-I disc having a diameter of 12 cm, a CD-I/CD-DA disc having a diameter of 12 cm (disc in which a CD-I disc and a CD-DA disc mixedly exist), and a CD-DA disc having a diameter of 12 cm or 8 cm (ordinary compact disc for reproducing a music) as discs. A data format of the CD-I will now be described.

b1. Data structure

The CD-I records data in a format which is fundamentally based on the CD-ROM. A recording unit of the data is set to a block in a manner similar to the CD-ROM. One block corresponds to 98 frames. A capacity of one block is set to 6 (the number of audio data) × 2 (stereophone two channels) ×

2 (byte unit conversion basis) ×

98 (the number of frames) = 2352 bytes

In the case of the disc having a diameter of 12 cm, a recording capacity of the whole CD-I disc is equal to about 640 Mbytes.

There are two kinds of data structures of the CD-I of a form 1 and a form 2. They correspond to a mode 1 and a mode 2 of the CD-ROM, respectively. In the mode 1 in the CD-ROM, an error detection code and an error correction code are added to the data of one block, thereby enabling a strong error correction to be executed. In the mode 2 in the CD-ROM, none of the error detection code and the error correction code is added, thereby enabling a large amount of user's data to be assured.

In the CD-I, the form 1 and the form 2 can be designated every block and both of the forms 1 and 2 can be allowed to mixedly exist in one disc.

The CD-I format differs from the CD-ROM format with respect to a point that a sub-header of eight bytes is provided at the head of the user's data. Each block in which audio data, image, and data have been recorded is time-sharingly multiplexed to the sub-header on a block unit basis. To process them in a real-time manner, the necessary data is written twice and stored. The sub-header comprises four items of a file number, a channel number, a sub-mode, and a data type.

That is, FIG. 9A shows a structure of the form 1. In the form 1, a sync (12 bytes) is provided at the head. A header (4 bytes) is subsequently provided. Further, a sub-header (8 bytes) is provided. After that, user's data (2048 bytes) is provided. An error detection code EDC (4 bytes) and a P parity (172 bytes) and a Q parity (104 bytes) for error correction are added to the user's data. In the form 1, the error correcting capability is enhanced. The form 1 is suitable in the case of handling data such as character data, program data, or the like whose errors cannot be interpolated.

FIG. 9B shows a structure of the form 2. In the form 2, a sync (12 bytes) is provided at the head. A header (4 bytes) is subsequently provided. Further, a sub-header (8 bytes) is provided. After that, user's data (2324 bytes) is provided and a reserve area (4 bytes) is provided. The form 2 is suitable in the case of handling data such as audio data, video data, or the like which can be interpolated.

As shown in FIG. 10, the sub-header which is added to the head of the user's data comprises a file number (2 bytes), a channel number (2 bytes), a sub-mode (2 bytes), and a data type (2 bytes).

b2. Writing of audio data

Four modes are determined when audio data in CD-I is written.

One of the modes is based on the same recording system as that of the existing CD-DA in which the sampling frequency is set to 44.1 kHz and the number of quantization bits is set to 16 bits. This mode intends to perform a super Hi-Fi reproduction.

In another mode, an ADPCM (Adaptive Differential PCM) is used as a recording method. The sampling frequency is set to 37.8 kHz and the number of quantization bits is set to 8 bits. In this mode, a sound quality which is close to that of an LP record can be reproduced. The reproducing time is set to two hours in the stereophonic mode and is set to four hours in the monaural mode. This mode intends to perform a Hi-Fi reproduction.

In still another mode, the ADPCM is used as a recording method. The sampling frequency is set to 37.8 kHz and the number of quantization bits is set to 4 bits.

In this mode, a sound quality which is close to that of an FM broadcasting can be reproduced. The reproducing time is set to four hours in the stereophonic mode and is set to eight hours in the monaural mode. This mode intends to perform a Hi-Fi reproduction of a long time.

In further another mode, the ADPCM is used as a recording method. The sampling frequency is set to 18.9 kHz and the number of quantization bits is set to 4 bits. The reproducing time is set to eight hours in the stereophonic mode and is set to sixteen hours in the monaural mode. This mode intends to perform a speech reproduction of a conversation, conference, speech, and the like.

b3. Writing of video data

Image data is processed as follows in accordance with the type of image data. In the case of a natural image, the sampling frequency of a luminance signal Y is set to 7.6 MHz and the sampling frequencies of color difference signals U and V are set to 3.8 MHz. The image data is sampled at ratios of 4:2:2. Bits are compressed to four bits and recorded. They are returned to eight bits upon reproduction.

In the case of graphics, a CLUT (Color Lookup Table) is used. The CLUT graphics include three modes of 256 colors (8 bits), 128 colors (7 bits), and 16 colors (4 bits). Necessary colors can be selected from sixteen million colors and used.

In the case of an animation, a run length code is used. In this case, image data is compressed by using color information and a length between pixels. An animation on a full screen can be realized by using such a code.

b4. Disc

In the CD-I disc, mechanical dimensions such as outer diameter dimension, center hole dimension, thickness, and the like, optical parameters such as refractive index, reflectance, and the like, recording parameters such as disc rotating direction, recording linear velocity, track shape, track pitch, and the like, use environment situations, and the like are all similarly set those of an ordinary compact disc (CD-DA) for a music.

The disc is constructed in a manner such that it is possible to discriminate whether the disc is a CD-I disc or not on the basis of the contents in a TOC (Table of Contents) of a lead-in area of the disc. That is, in the CD-I disc or CD-I/CD-DA disc, a PSEC is set to 10 when (POINT=A0). On the other hand, in the other discs, the PSEC is set to 00 when (POINT=A0). Therefore, from the PSEC when (POINT=A0), it is possible to judge whether the disc is a CD-I disc or a CD-I/CD-DA disc or another disc. Control fields of (POINT=A0, A1, A2) of the CD-I disc are set to (01×0). A control field of (POINT=A0) of the CD-I/CD-DA disc is always set to (01×0) and the other control fields are set to (00×0). Consequently, from the control field, it is possible to judge whether the disc is a CD-I disc or a CD-I/CD-DA disc.

b5. Hardware

In the CD-I, since audio data is included and a high-speed process in a real-time manner is needed, a process by a machine language is executed. As a CPU for such a purpose, a CPU of 16 bits of the 68000 type which has been developed by Motorola Inc. is designated. A CD-RTOS (Real-Time Operating System) which handles various kinds of files fundamentally uses the OS9 and the program is assembled as an ROM into the system. At least an X-Y device and two trigger buttons are prepared as an input device. Two systems of audio and video are prepared as an output. The CD-I player can reproduce a CD-DA for musics.

c. Internal construction of an embodiment

Figure 11:
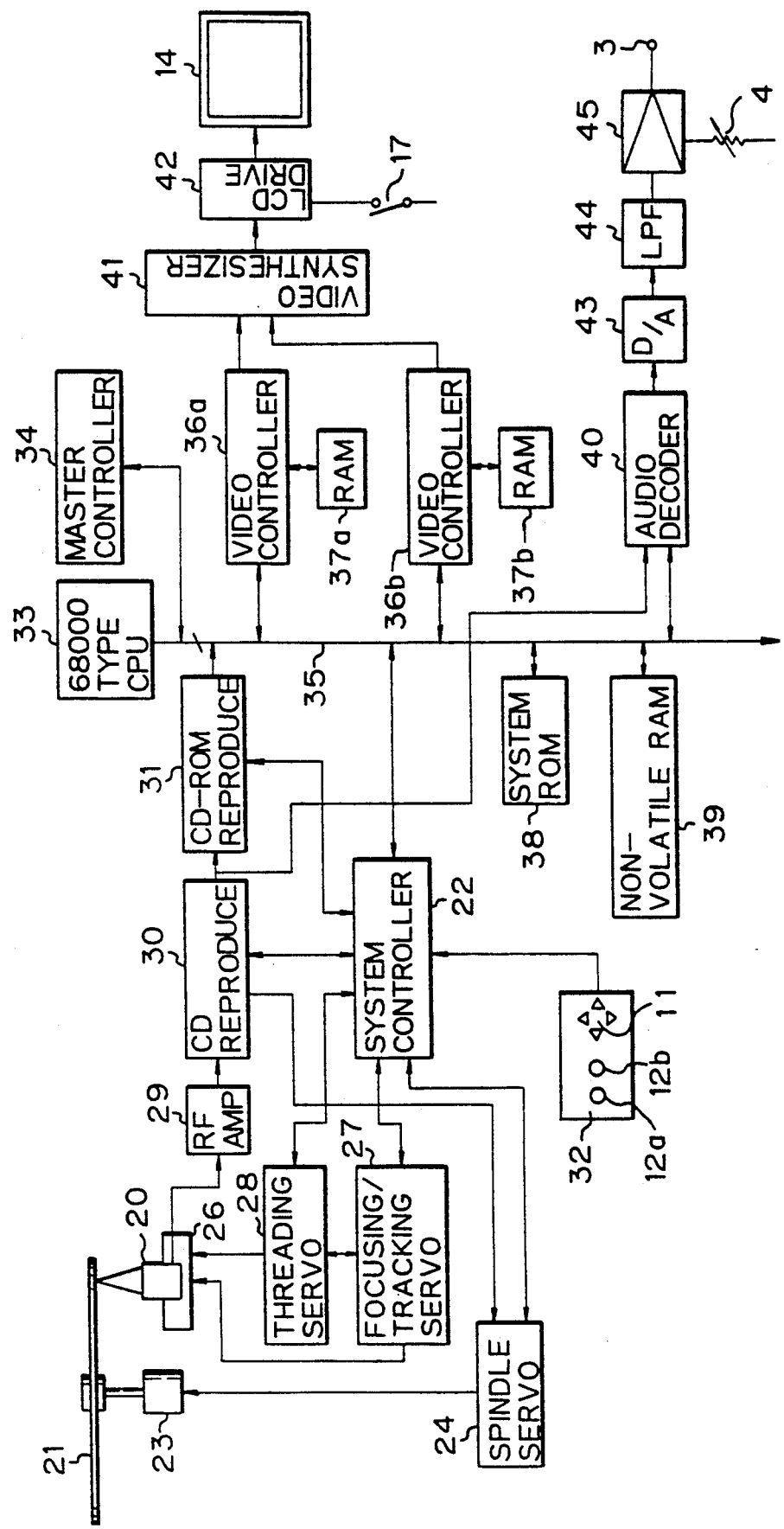
FIG. 11 is a block diagram showing an internal construction of the embodiment of the invention.

FIG. 11 shows an internal construction of the CD-I player 1 to which the invention has been applied. In FIG. 11, a disc 21 is rotated by a spindle motor 23 at a CLV (constant linear velocity). The rotation of the spindle motor 23 is controlled by a spindle servo circuit 24 on the basis of clocks which are reproduced by a CD reproducing circuit 30. An output of a system controller 22 is supplied to the spindle servo circuit 24.

A recording signal on the disc 21 is reproduced by the optical pickup 20. There are enclosed in the optical pickup 20 a laser light source such as semiconductor lasers and the like an objective lens for focusing the light beam from the laser light source onto the signal recording surface of the disc, a biaxial device for driving the objective lens in both the focusing direction and the tracking direction a photodetector for receiving the returning light beam from the disc, optical element for separating the emitting light beam from the laser light source and the returning light beam from the disc and for guiding the returning light beam to the photodetector. An output of a focusing/tracking servo circuit 27 is supplied to the biaxial device of the optical pickup 20. The system controller 22 is connected to the focusing/tracking servo circuit 27. The focusing/tracking servo circuit 27 generates focusing error and tracking error signals based on a detection output from the photodetector of the optical pickup 20 and performs servo controls to two axes in the focusing direction and the tracking direction of the biaxial device of the optical pickup 20 based on the generated error signals.

The optical pickup 20 is supported to be movable in the radial direction of the disc 21 by a slide feeding mechanism 26 using, for instance, a linear motor. The slide feeding mechanism 26 is controlled by a threading servo circuit 28. The system controller 22 is connected to the threading servo circuit 28. The optical pickup 20 can be accessed to a desired track position by the slide feeding mechanism 26.

An output of the optical head 25 is supplied to a CD reproducing circuit 30 through an RF amplifier 29. The CD reproducing circuit 30 comprises a reproducing circuit of bit clocks, an EFM demodulating circuit, a CIRC error correction circuit, and the like. The CD reproducing circuit 30 EFM demodulates the output of the optical head 25 and executes an error correcting process. The CD reproducing circuit 30 is controlled by the system controller 22.

An output of the CD reproducing circuit 30 is supplied to a CD-ROM reproducing circuit 31. The CD-ROM reproducing circuit 31 comprises a sync detecting circuit, a descrambling circuit, an error correction circuit, and the like. A sync signal is detected by the CD reproducing circuit 30 and the scramble is released. A header address is checked and a target block is accessed. In the case of the form 1, the error correcting process is further executed. The CD-ROM reproducing circuit 31 is controlled by the system controller 22. An input from an input device 32 is given to the system controller 22. The input device 32 comprises the X-Y device 11 and two trigger buttons 12a and 12b.

Reference numeral 33 denotes a CPU to control the CD-I system. A CPU of the 68000 type is used as a CPU 33. A master controller 34 is connected to the CPU 33. The CPU 33 and the system controller 22 are bidirectionally connected. A bus 35 is led out of the CPU 33. One chip in which the CPU 33 and the master controller 34 are assembled can be also used.

The data reproduced by the CD-ROM reproducing circuit 31 is sent to the bus 35. RAMs 37a and 37b are connected to the bus 35 through video controllers 36a and 36b, respectively. A system ROM 38 and a non-volatile RAM 39 to back up are bidirectionally connected to the bus 35. An audio decoder 40 is connected to the bus 35.

The image data in the data reproduced by the CD-ROM reproducing circuit 31 is supplied to video controllers 36a and 36b under control of the CPU 33. Video signals based on the image data are formed by the video controllers 36a and 36b. The video signals are supplied to a video synthesizer 41. The video synthesizer 41 synthesizes the video signal from the video controller 36a and the video signal from the video controller 36b. An output of the video synthesizer 41 is supplied to the LCD display via an LCD driving circuit 42. The driving of the LCD display 14 can be turned on/off by the LCD driving switch 17.

The audio data in the data reproduced by the CD-ROM reproducing circuit 31 is supplied to the audio decoder 40 under control of the CP0 33. In the case of the audio data based on the ADPCM, the audio decoder 40 ADPCM decodes the audio data. The decoded audio data is supplied to the D/A converter 43 and is converted into the analog signal. The analog signal is generated from the head phones output terminal 3 through a low pass filter 44 and an amplifier 45. An audio signal level which is generated from the head phones output terminal 3 can be set by the sound volume adjusting dial 4.

d. Operation of an embodiment

Figure 13:
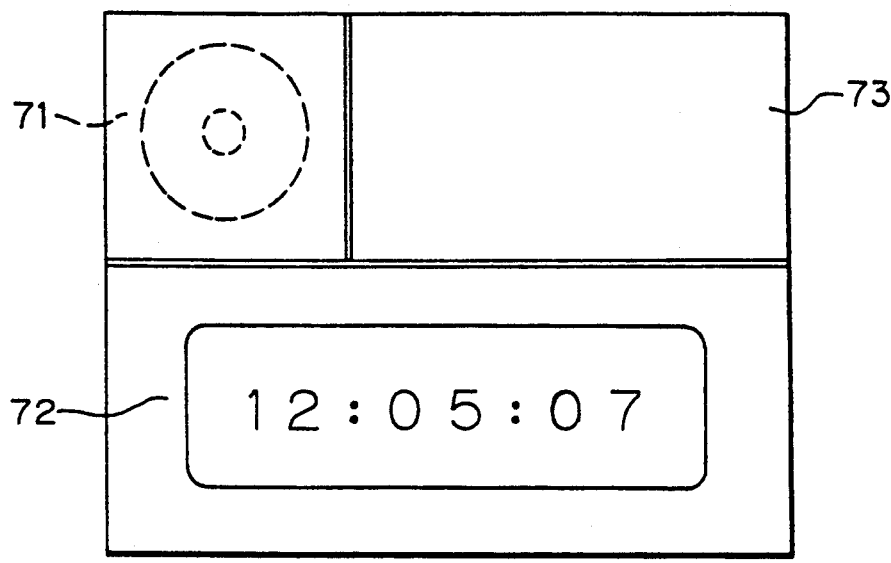
FIG. 13 is a schematic diagram which is used in the explanation of the indication of a display in the embodiment of the invention.

The operation of a embodiment of the invention will now be described. FIG. 13 shows the operation when the LCD display 14 is turned on.

Figure 12:
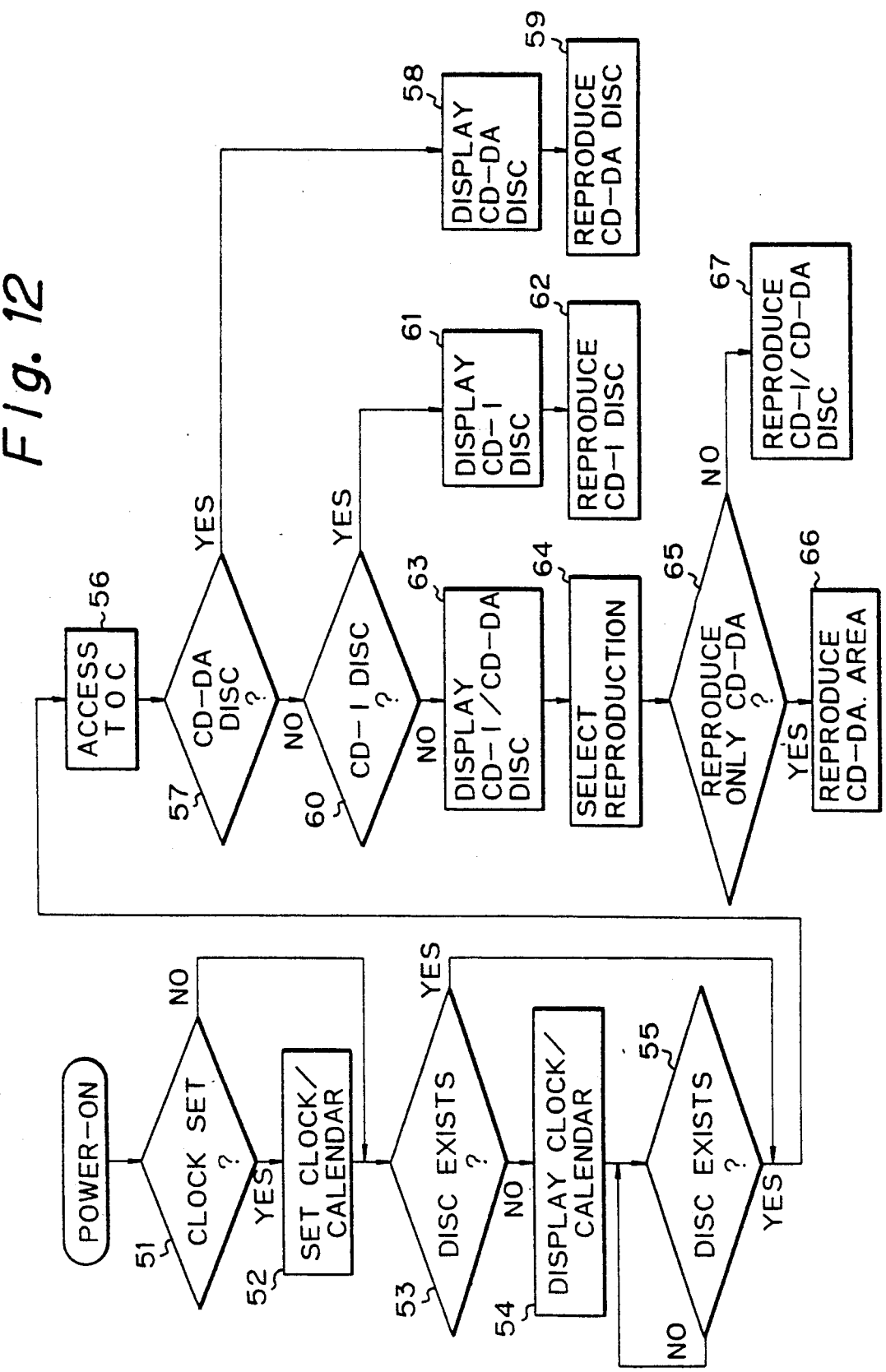
FIG. 12 is a flowchart which is used in the explanation of the operation of the embodiment of the invention.

In FIG. 12, when the power source is turned on by the power on/off switch 5, a check is made to see if a calendar and an internal clock have been set or not (step 51).

In the case of setting the calendar and the internal clock, the calendar and the internal clock are set by using the X-Y device 11 and the trigger buttons 12a and 12b (step 52). After the calendar and the internal clock were set, a check is made to see if the disc has been loaded or not (step 53).

If the calendar and the internal clock are not set in step 51, step 53 follows and a check is made to see if the disc has been loaded or not.

If the disc is not loaded, an indication of the unloaded state of the disc is display by the LC display 14 (step 54). That is, if the disc is not loaded, as shown in FIG. 13, an indication of the unloaded state of the disc is displayed in a display area 71 of the LCD display 14 and the calendar and the time are displayed in a display area 72. The discrimination regarding the loading of the disc is continued (step 55).

If it is detected in step 53 or step 55 that the disc has been loaded, the TOC of the innermost rim of the disc is accessed (step 56). From the data of the TOC, a check is first made to see if the loaded disc is a CD-I/CD-DA disc or a CD-I disc or a CD-DA disc (step 57). That is, in the case of the CD-I disc or CD-I/CD-DA disc, PSEC when (POINT=A0) is set to 10 In the case of another disc, since PSEC when (POINT=A0) has been set to 00, a check is made from the PSEC when (POINT=A0) to see if the disc is a CD-I disc or a CD-DA disc.

Figure 14:
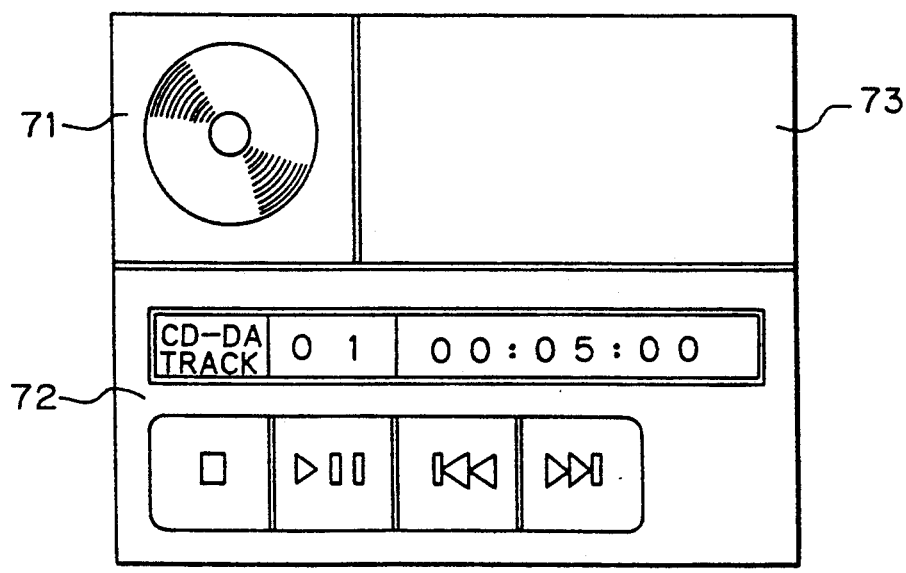
FIG. 14 is a schematic diagram which is used in the explanation of the indication of the display in the embodiment of the invention.

If it is decided that the disc is the CD-DA disc, an indication when the CD-DA disc has been loaded is displayed in the LCD display 14 (step 58). That is when the CD-DA disc has been loaded, a shown in FIG. 14, a content indicating that the disc has been loaded is displayed in the display area 71 of the LCD display 14. An indication of an operation key such as PLAY, AMS, STOP, etc. to operate the CD-DA is displayed in the display area 72.

When the operation key displayed in the display area 72 is operated by using the X-Y device 11 and the trigger buttons 12a and 12b, the CD-DA disc is reproduced in accordance with the above operation (step 59).

If it is determined in step 57 that the disc is not the CD-DA disc, a check is made to see if the disc is a CD-I disc or a CD-I/CD-DA disc (step 60). Namely, control fields of (POINT=A0, A1, A2) of the CD-I disc are set to (01×0) and a control field of (POINT=A0) of the CD-I/CD-DA disc is always set to (01×0). The other control fields are set to (00×0). Therefore, from the control field, it is judged whether the disc is the CD-I disc or the CD-I/CD-DA disc.

Figure 15:
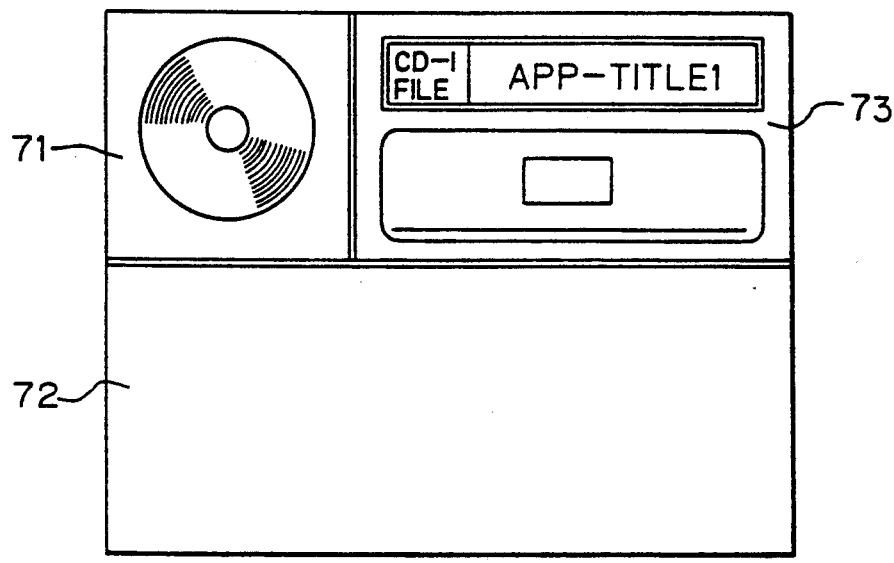
FIG. 15 is a schematic diagram which is used in the explanation of the indication of the display in the embodiment of the invention.

If it is determined that the loaded disc is the CD-I disc, an indication when the CD-I disc has been loaded is displayed on the LCD display 14 (step 61). That is, if the CD-I disc has been loaded, as shown in FIG. 15, an indication showing that the disc has been loaded is displayed in the display area 71 of the LCD display 14. A title and the like of an application software are displayed in the display area 73.

When operating by using the X-Y device 11 and the trigger buttons 12a and 12b in accordance with an instruction of the application software, the CD-I disc is reproduced in accordance with the operation (step 62).

Figure 16:
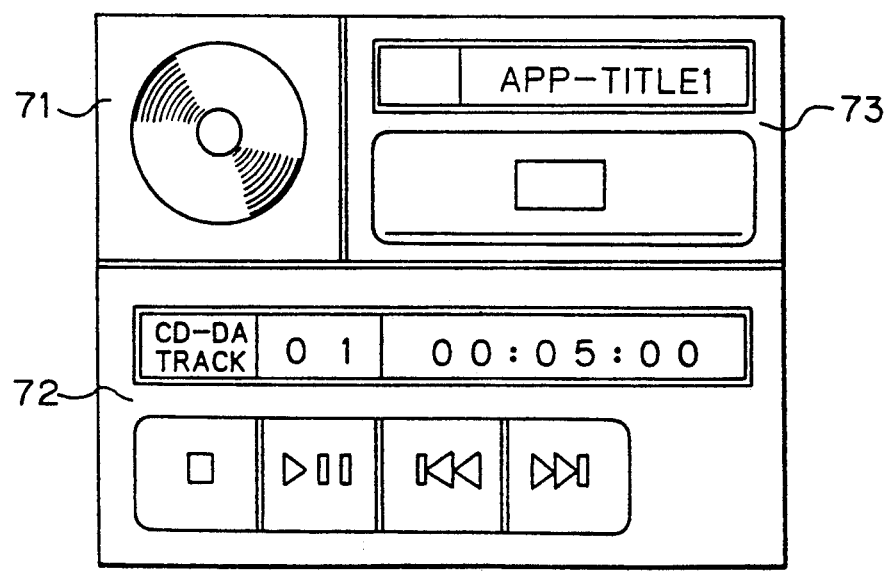
FIG. 16 is a schematic diagram which is used in the explanation of the indication of the display in the embodiment of the invention.

If it is decided that the loaded disc is the CD-I/CD-DA disc, an indication when the CD-I/CD-DA disc has been loaded is displayed on the LCD display 14 (step 64). That is, when the CD-I/CD-DA disc has been loaded, as shown in FIG. 16, an indication showing that the disc has been loaded is displayed in the display area 71 of the LCD display 14. An indication of the operation key such as PLAY, AMS, STOP, or the like to operate the CD-DA is displayed in the display area 72. The title and the like of the application software are displayed in a display area 73.

In the case of the CD-I/CD-DA disc, a check is made to see if only the CD-DA is reproduced or not (step 65). When the operation key displayed in the display area 72 is operated by using the X-Y device 11 and the trigger buttons 12a and 12b, only the portion of the CD-DA area is reproduced in accordance with the operation (step 66). When operating by using the X-Y device 11 and the trigger buttons 12a and 12b in accordance with the instruction of the application software, the CD-I/CD-DA is reproduced in accordance with the operation (step 67).

As mentioned above, according to an embodiment of the invention, in the case of the CD-I/CD-DA disc, only the CD-DA area can be reproduced. Thus, only the sounds of the application software can be enjoyed.

e. Operation when display is unnecessary

In the case of reproducing the CD-DA disc, only the audio data is reproduced, so that there is no need to display on the LCD display 14. In the case of reproducing only the audio data from the CD-I/CD-DA disc as well, there is no need to display on the LCD display 14. As mentioned above, if the LCD display 14 is driven when the screen display is unnecessary, an electric power is vainly consumed. In the embodiment of the invention, therefore, when there is no need to display a screen, by enabling the LCD display 14 to be turned off by the LCD driving switch 17, the electric power consumption can be reduced.

If the LCD display 14 is turned off, however, it is impossible to execute the operation while looking at the indication on the LCD display 14. It is also possible to provide special keys for audio reproduction in addition to the X-Y device 11 and the trigger buttons 12a and 12b. However, if such keys are provided, the number of keys increases and the apparatus enlarges in size. In the embodiment of the invention, accordingly, the X-Y device 11 and to trigger buttons 12a and 12b are allowed to function as special keys for audio reproduction when the loaded disc is the CD-DA disc and the driving of the LCD display 14 has been turned off or when the loaded disc is the CD-DA disc and only the audio reproduction is executed and the driving of the LCD display 14 has been turned off. That is, for instance, the left direction and the right direction of the X-Y device 11 function as an "AMS key", the trigger button 12a functions as a "PLAY/PAUSE key", and the trigger button 12b functions as a "STOP key". Consequently, even when the driving of the LCD display 14 has been stopped, various audio reproducing operations can be freely executed.

Since the video reproduction is not performed in the CD-DA disc, it is also possible to construct in a manner such that if the CD-DA disc has been loaded, the X-Y device 11 and the trigger buttons 12a and 12b can be allowed to function as special keys for audio reproduction irrespective of the on/off of the LCD display 14. It is also possible to construct in a manner such that the X-Y device 11 and the trigger buttons 12a and 12b are allowed to function as special keys for audio reproduction irrespective of the kind of disc is the LCD display 14 has been turned off.

According to the invention, the disc driving section to rotate the loaded disc, the head driving section to move the optical head in the radial direction of the disc, and the printed circuit board to process the reduction signal from the optical head are enclosed in the casing of the player main body portion 2 of the CD-I player 1 and the computer comprising the CPU of the 68000 type is also enclosed. The X-Y device 11 and the trigger buttons 12a and 12b are arranged with the middle cover 7. The LCD display 14 is arranged on the outer cover 15. The middle cover 7 and the outer cover 15 are rotatably attached to the player main body portion 2. As mentioned above, all of the necessary portions are integrated and the apparatus is miniaturized, so that the CD-I system can be easily carried to the outside and can be used in the outside.

What is claimed is:

1. A portable disc player for reproducing an optical disc on which image data in addition to audio data have been recorded and in which a sub header portion is provided subsequent to a head sync portion and a header portion of user's data, comprising:
   (A) a casing enclosing
      (a) disc rotation driving means for rotating a loaded optical disc,
      (b) an optical pickup which is provided so as to be movable in a radial direction of the optical disc which is rotated by the disc rotation driving means,
      (c) a signal processing section to execute a predetermined signal process to a signal which has been read out by said optical pickup,
      (d) control means for controlling operations of the disc rotation driving means, the optical pickup, and the signal processing section on the basis of input signals from an operating section,
      (e) a disc loading section located at a position lower than the surface of the casing and which enables the rotation of the optical disc by the disc rotation driving means, and wherein a disc receiving section of the disc rotation driving means is arranged so as to be projected to the disc loading section,
      (f) a rotary member which has a disc sandwiching section for sandwiching the optical disc together with the disc rotation driving means in a state in which the disc sandwiching section is closed for the casing and for rotating the optical disc together with the disc rotation driving means; and
   (B) a display means which is rotatably hinged to said casing.

2. A player according to claim 1, wherein the rotary member is provided so as to open or close the disc loading section of the casing and is attached to the casing so as to be covered by the display means in a state in which a surface on a side opposite to a surface which faces the casing is closed.

3. A player according to claim 1, wherein the rotary member has checking means which allows for visual checking from the outside of the casing of whether the optical disc has been located to the disc loading section or not when the rotary member is located at such a position as to close the casing.

4. A player according to claim 1, wherein a plurality of switches constructing the operating section and a pointing device are arranged on a surface on an opposite side of a surface which faces the casing on a rotation free end side of the rotary member.

5. An optical disc reproducing apparatus for reproducing an optical disc having a diameter of 12 cm on which image data in addition to audio data have been recorded and a sub header portion is provided subsequent to a head sync portion and a header portion of user's data, comprising:
   (A) a casing enclosing
      (a) disc rotation driving means for rotating a loaded optical disc,
      (b) an optical pickup which is provided so as to be movable in a radial direction of the optical disc which is rotated by the disc rotation driving means,
      (c) a signal processing section to execute a predetermined signal process to a signal which has been read out by said optical pickup,
      (d) control means for controlling operations of the disc rotation driving means, the optical pickup, and the signal processing section on the basis of input signal from an operating section,
      (e) a disc loading section, located at a position lower than the surface of the casing, which enables the rotation of the optical disc by the disc rotation driving means,
      (f) a disc mounting section for the disc rotation driving means so as to be projected to the bottom surface of the disc loading section, and wherein the disc rotation driving means and the optical pickup are provided for the disc loading section, (g) a rotary member which has a rotational fulcrum in one end portion of the casing and is arranged between the casing the display means in a closed state for the casing when the rotary member is in a closed state, (h) a disc sandwiching means for rotatably sandwiching the optical disc mounted onto the disc mounting section of the disc rotation driving means together with the disc rotation driving means when the rotary member is in the closed state for the casing, wherein said disc sandwiching means is provided on a side of a surface of the rotary member which faces the casing; and (B) a display means which is rotatably hinged to said casing.

6. An apparatus according to claim 5, wherein a plurality of switches constructing a part of the operating section are provided on a surface on a side opposite to a surface which faces the casing when the rotary member is in the closed state for the casing and on a surface on a rotation free end side of the rotary member.

7. An apparatus according to claim 5, wherein a display section of the display means is arranged on a surface on a side which faces the casing when the display means is in a closed state for the casing.

8. A portable disc player for reproducing the optical disc on which image data in addition to audio data have been recorded, comprising:

(A) a casing enclosing (a) disc rotation driving means for rotating a loaded optical disc, (b) an optical pickup which is provided so as to be movable in a radial direction of the optical disc which is rotated by the disc rotation driving means, (c) a signal processing section to execute a predetermined signal process to a signal which has been read out by the optical pickup, (d) an operating section for allowing a user to input signals for controlling the operation of the portable disc player, (e) control means for controlling operations of the disc rotation driving means, the optical pickup, and the signal processing section on the basis of the input signal from the operating section, (f) a disc loading section located at a position lower than the surface of the casing and which enables the rotation of the optical disc by the disc rotation driving means, and wherein a disc receiving section of the disc rotation driving means is arranged so as to be projected to the disc loading section, (f) a middle cover hinged to the casing which has a disc sandwiching section for sandwiching the optical disc together with the disc rotation driving means when the disc sandwiching section is moved to a position which closes a portion of the casing and for rotating the optical disc together with the disc rotation driving means; and (B) a display means which is rotatably hinged to the casing.

9. A player according to claim 8, wherein the middle cover is provided so as to open or close the disc loading section of the casing and is hinged to the casing so as to be covered by the display means when the display means is moved to a position which closes the casing.

10. A player according to claim 8, wherein the middle cover has a window which allows for visual checking from the outside of the casing of whether or not the optical disc has been loaded in the disc loading section when the middle cover is located at the position which closes a portion of the casing.

11. A player according to claim 8, wherein a plurality of switches and a pointing device constructing the operating section are arranged on a surface of the middle cover which faces away from the disc loading section and at an edge of the middle cover which is most distant from a portion of the middle cover which is hinged to the casing.

* * * * *